(12) United States Patent
Tamrakar et al.

(10) Patent No.: US 10,651,997 B2
(45) Date of Patent: May 12, 2020

(54) PILOT SIGNAL CONFIGURATION METHOD AND DEVICE

(71) Applicant: CHINA ACADEMY OF TELECOMMUNICATIONS TECHNOLOGY, Beijing (CN)

(72) Inventors: Rakesh Tamrakar, Beijing (CN); Runhua Chen, Beijing (CN); Qiubin Gao, Beijing (CN); Wenhong Chen, Beijing (CN); Hui Li, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 78 days.

(21) Appl. No.: 15/759,513

(22) PCT Filed: Jun. 14, 2016

(86) PCT No.: PCT/CN2016/085742
§ 371 (c)(1),
(2) Date: Mar. 12, 2018

(87) PCT Pub. No.: WO2017/054514
PCT Pub. Date: Apr. 6, 2017

(65) Prior Publication Data
US 2019/0149297 A1  May 16, 2019

(30) Foreign Application Priority Data

Sep. 29, 2015  (CN) .......................... 2015 1 0634751

(51) Int. Cl.
*H04W 4/00* (2018.01)
*H04L 5/00* (2006.01)
(Continued)

(52) U.S. Cl.
CPC ............ *H04L 5/0051* (2013.01); *H04L 5/005* (2013.01); *H04L 5/0053* (2013.01); *H04L 5/1469* (2013.01); *H04W 72/042* (2013.01)

(58) Field of Classification Search
CPC ... H04L 5/0051; H04L 5/0048; H04L 1/0026; H04L 5/0007; H04L 5/1469;
(Continued)

(56) References Cited

U.S. PATENT DOCUMENTS

2008/0107158 A1* 5/2008 Yoshii .................... H04B 1/76
375/146
2012/0113852 A1 5/2012 Xu et al.
(Continued)

FOREIGN PATENT DOCUMENTS

CN  101404794 A  4/2009
CN  101415226 A  4/2009
(Continued)

OTHER PUBLICATIONS

First Office Action and Search Report from CN app. No. 201510634751. 3, dated Mar. 6, 2019, with English translation from Global Dossier.
(Continued)

*Primary Examiner* — Stephen M D Agosta
(74) *Attorney, Agent, or Firm* — Ladas & Parry, LLP

(57) ABSTRACT

The present disclosure provides in some embodiments pilot signal configuration methods and pilot signal configuration devices. The pilot signal configuration method includes steps of: determining configuration information about a pilot signal to be transmitted within a special downlink subframe for a UE; and transmitting the configuration information to the UE. According to some embodiments of the present disclosure, it is able to achieve the configuration of the pilot signal to be transmitted within the special downlink subframe.

14 Claims, 5 Drawing Sheets

REs occupied by CSI-RS

(51) Int. Cl.
*H04L 5/14* (2006.01)
*H04W 72/04* (2009.01)

(58) Field of Classification Search
CPC ........... H04W 72/042; H04W 72/0406; H04W 72/044; H04W 72/08; H04W 74/002; H04W 74/006
See application file for complete search history.

(56) References Cited

U.S. PATENT DOCUMENTS

| | | | | |
|---|---|---|---|---|
| 2012/0155414 | A1* | 6/2012 | Noh | H04B 7/0417 370/329 |
| 2013/0265945 | A1* | 10/2013 | He | H04W 60/04 370/329 |
| 2014/0050191 | A1* | 2/2014 | Kim | H04L 5/001 370/329 |
| 2014/0198675 | A1 | 7/2014 | He et al. | |
| 2015/0181569 | A1 | 6/2015 | Kim et al. | |
| 2015/0215963 | A1* | 7/2015 | Zhu | H04L 5/14 370/280 |

FOREIGN PATENT DOCUMENTS

| | | |
|---|---|---|
| CN | 101426283 A | 5/2009 |
| CN | 101499963 A | 8/2009 |
| CN | 101426269 B | 6/2010 |
| CN | 101888636 A | 11/2010 |
| CN | 102710397 A | 10/2012 |
| CN | 104104637 A | 10/2014 |
| EP | 2849519 A1 | 3/2015 |
| KR | 20110030372 A | 3/2011 |
| WO | 2014/113078 A1 | 7/2014 |

OTHER PUBLICATIONS

Office Action from EP app. No. 16850139.3-1219, dated Apr. 23, 2019.
Notification of Reasons for Refusal, from JP app. No. 2018515994, dated Feb. 5, 2019, with machine English translation from JPO.
"Considerations on CSI-RS transmission in TDD special subframe", 3GPP TSG RAN WG1 Meeting #73, Fukuoka, Japan, May 20-24, 2013.
International Search Report for PCT/CN2016/085742, dated Aug. 26, 2016, and its English translation provided by WIPO.
Written Opinion of the International Search Authority for PCT/CN2016/085742, dated Aug. 26, 2016, and its English translation provided by Bing.com Microsoft Translator.
CATT "Introduction of CSI-RS in DwPTS for TDD, 3GPP TSG RAN WG1 Meeting #82, R1-153933", 3GPP, Aug. 28, 2015, sections 1-4.
CATT, "Finalizing CSI-RS in DwPTS, 3GPP TSG RAN WG1 Meeting #83, R1-156588", 3GPP, Nov. 22, 2015, sections 2-5.
From EPO Application No. 16850139.3, Supplementary European Search Report with Search Opinion dated Aug. 2, 2018.
From TW Application No. 105119389, Office Action dated Mar. 23, 2017 with machine English translation.
R1-155203—CATT, "Introduction of CSI-RS in DwPTS for TDD"; 3GPP TSG RAN WG1 Meeting #82bis; Malmo, Sweden, Oct. 5-9, 2015; pp. 1-2.
3rd Generation Partnership Project; Technical Specification Group Radio Access Network; Evolved Universal Terrestrial Radio Access (E-UTRA); Physical channels and modulation (Release 12); May 2015; pp. 1-136.
International Preliminary Report on Patentability (IPRP; Ch. 1) for PCT/CN2016/085742, dated Apr. 12, 2018, and its English translation provided by WIPO.
Written Opinion of the International Search Authority for PCT/CN2016/085742, dated Aug. 26, 2016, and its English translation provided by WIPO.

* cited by examiner

PILOT SIGNAL CONFIGURATION METHOD AND DEVICE

CROSS-REFERENCE TO RELATED APPLICATIONS

The present application is the U.S. national phase of PCT Application No. PCT/CN2016/085742 filed on Jun. 14, 2016, which claims priority to the Chinese patent application No. 201510634751.3 filed on Sep. 29, 2015, the disclosures of which are incorporated herein by reference in their entireties.

TECHNICAL FIELD

The present disclosure relates to the field of communication technology, in particular to pilot signal configuration methods and pilot signal configuration devices.

BACKGROUND

Currently, pilot signals configured by a base station for a User Equipment (UE) are transmitted within a normal downlink subframe. For example, a Channel State Information Reference Signal (CSI-RS) has been introduced into a Release-10 (Rel-10) Long Term Evolution (LTE) system. The CSI-RS may be configured with 2, 4 or 8 ports.

Currently, there is no configuration in the Specification for the transmission of the pilot signal within a special downlink subframe, e.g., a Downlink Pilot Time Slot (DwPTS).

SUMMARY

An object of the present disclosure is to provide pilot signal configuration methods and pilot signal configuration devices, so as to achieve the configuration for the transmission of the pilot signal within the special downlink subframe.

In one aspect, the present disclosure provides in some embodiments a pilot signal configuration method, including steps of: determining configuration information about a pilot signal to be transmitted within a special downlink subframe for a UE; and transmitting the configuration information to the UE.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the step of transmitting the configuration information to the UE includes transmitting second pilot signal configuration signaling different from first pilot signal configuration signaling to the UE, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the step of transmitting the configuration information to the UE includes determining first configuration information about the pilot signal for the UE, the first configuration information indicating that the pilot signal is to be transmitted within both a normal downlink subframe and the special downlink subframe, or determining second configuration information about the pilot signal for the UE, the second configuration information indicating that the pilot signal is to be transmitted within the special downlink subframe rather than the normal downlink subframe.

In a possible embodiment of the present disclosure, the step of transmitting the configuration information to the UE further includes transmitting third pilot signal configuration signaling to the UE, the third pilot signal configuration signaling carries configuration information determined for the UE, and the configuration information determined for the UE includes the first configuration information or the second configuration information.

In another aspect, the present disclosure provides in some embodiments a pilot signal configuration method, including steps of: receiving configuration information about a pilot signal; and determining a configuration of the pilot signal to be transmitted within a special downlink subframe in accordance with the configuration information.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the step of receiving the configuration information about the pilot signal includes receiving second pilot signal configuration signaling different from first pilot signal configuration signaling, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the step of receiving the second pilot signal configuration signaling different from the first pilot signal configuration signaling includes: receiving pilot signal configuration signaling; and determining the pilot signal configuration signaling as the second pilot signal configuration signaling different from the first pilot signal configuration signaling in accordance with indication information carried in the received pilot signal configuration signaling. The second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the step of receiving the configuration information about the pilot signal includes receiving third pilot signal configuration signaling. The third pilot signal configuration signaling carries configuration information determined for a current UE, the configuration information determined for the current UE includes first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe.

In a possible embodiment of the present disclosure, the step of determining the configuration of the pilot signal to be transmitted within the special downlink subframe in accordance with the configuration information includes: in the case that the configuration information is the first configuration information, searching for the resource elements corresponding to indices of the pilot signal carried in the first configuration information and configured to transmit the pilot signal within the special downlink subframe, in the case that no resource element has been searched, determining that the first configuration information is invalid or determining that the configuration of the pilot signal to be transmitted within the normal downlink subframe is valid while the configuration of the pilot signal to be transmitted within the special downlink subframe is invalid; and in the case that the configuration information is the second configuration information, searching for the resource elements corresponding to the indices of the pilot signal carried in the second configuration information and configured to transmit the pilot signal within the special downlink subframe, and in the case that no resource element has been searched, determining that the second configuration information is invalid.

In yet another aspect, the present disclosure provides in some embodiments a pilot signal configuration device, including: a pilot signal configuration determination module configured to determine configuration information about a pilot signal to be transmitted within a special downlink subframe for a UE; and a configuration information transmission module configured to transmit the configuration information to the UE.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the configuration information transmission module is further configured to transmit second pilot signal configuration signaling different from first pilot signal configuration signaling to the UE, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the pilot signal configuration determination module is further configured to determine first configuration information about the pilot signal for the UE, the first configuration information indicating that the pilot signal is to be transmitted within both a normal downlink subframe and the special downlink subframe, or determine second configuration information about the pilot signal for the UE, the second configuration information indicating that the pilot signal is to be transmitted within the special downlink subframe rather than the normal downlink subframe.

In a possible embodiment of the present disclosure, the configuration information transmission module is further configured to transmit third pilot signal configuration signaling to the UE, the third pilot signal configuration signaling carries configuration information determined for the UE, and the configuration information determined for the UE includes the first configuration information or the second configuration information.

In still yet another aspect, the present disclosure provides in some embodiments a base station, including a processor, a memory and a transceiver. The processor is configured to read programs stored in the memory, so as to determine configuration information about a pilot signal to be transmitted within a special downlink subframe for a UE, and transmit through the transceiver the configuration information to the UE. The transceiver is configured to receive and transmit data under the control of the processor. The memory is configured to store therein data for the operation of the processor.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the processor is further configured to read the programs stored in the memory, so as to transmit second pilot signal configuration signaling different from first pilot signal configuration signaling to the UE, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the processor is further configured to read the programs stored in the memory, so as to determine first configuration information about the pilot signal for the UE, the first configuration information indicating that the pilot signal is to be transmitted within both a normal downlink subframe and the special downlink subframe, or determine second configuration information about the pilot signal for the UE, the second configuration information indicating that the pilot signal is to be transmitted within the special downlink subframe rather than the normal downlink subframe.

In a possible embodiment of the present disclosure, the processor is further configured to read the programs stored in the memory, so as to transmit third pilot signal configuration signaling to the UE, the third pilot signal configuration signaling carries configuration information determined for the UE, and the configuration information determined for the UE includes the first configuration information or the second configuration information.

In still yet another aspect, the present disclosure provides in some embodiments a pilot signal configuration device, including: a configuration information reception module configured to receive configuration information about a pilot signal; and a pilot signal configuration determination module configured to determine a configuration of the pilot signal to be transmitted within a special downlink subframe in accordance with the configuration information.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the configuration information reception module is further configured to receive second pilot signal configuration signaling different from first pilot signal configuration signaling, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the configuration information reception module is further configured to: receive pilot signal configuration signaling; and determine the pilot signal configuration signaling as the second pilot signal configuration signaling different from the first pilot signal configuration signaling in accordance with indication information carried in the received pilot signal configuration signaling. The second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the configuration information reception module is further configured to receive third pilot signal configuration signaling. The third pilot signal configuration signaling carries configuration information determined for a current UE, the configuration information determined for the current UE includes first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe.

In a possible embodiment of the present disclosure, the pilot signal configuration determination module is further configured to: in the case that the configuration information is the first configuration information, search for the resource elements corresponding to indices of the pilot signal carried in the first configuration information and configured to transmit the pilot signal within the special downlink subframe, in the case that no resource element has been searched, determine that the first configuration information is invalid or determine that the configuration of the pilot signal to be transmitted within the normal downlink subframe is valid while the configuration of the pilot signal to be transmitted within the special downlink subframe is invalid; and in the case that the configuration information is the second configuration information, search for the resource elements corresponding to the indices of the pilot signal carried in the second configuration information and configured to transmit the pilot signal within the special downlink subframe, and in the case that no resource element has been searched, determine that the second configuration information is invalid.

In still yet another aspect, the present disclosure provides in some embodiments a UE, including a processor, a memory and a transceiver. The processor is configured to read programs stored in the memory, so as to receive through the transceiver configuration information about a pilot signal, and determine a configuration of the pilot signal to be transmitted within a special downlink subframe in accordance with the configuration information. The transceiver is configured to receive and transmit data under the control of the processor. The memory is configured to store therein data for the operation of the processor.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the processor is further configured to read the programs stored in the memory, so as to receive second pilot signal configuration signaling different from first pilot signal configuration signaling, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the processor is further configured to read the programs stored in the memory, so as to: receive pilot signal configuration signaling; and determine the pilot signal configuration signaling as the second pilot signal configuration signaling different from the first pilot signal configuration signaling in accordance with indication information carried in the received pilot signal configuration signaling. The second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the processor is further configured to read the programs stored in the memory, so as to receive third pilot signal configuration signaling. The third pilot signal configuration signaling carries configuration information determined for a current UE, the configuration information determined for the current UE includes first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe.

In a possible embodiment of the present disclosure, the processor is further configured to read the programs stored in the memory, so as to: in the case that the configuration information is the first configuration information, search for the resource elements corresponding to indices of the pilot signal carried in the first configuration information and configured to transmit the pilot signal within the special downlink subframe, in the case that no resource element has been searched, determine that the first configuration information is invalid or determine that the configuration of the pilot signal to be transmitted within the normal downlink subframe is valid while the configuration of the pilot signal to be transmitted within the special downlink subframe is invalid; and in the case that the configuration information is the second configuration information, search for the resource elements corresponding to the indices of the pilot signal carried in the second configuration information and configured to transmit the pilot signal within the special downlink subframe, and in the case that no resource element has been searched, determine that the second configuration information is invalid.

According to the embodiments of the present disclosure, it is able to achieve the configuration of the pilot signal to be transmitted within the special downlink subframe, thereby to transmit downlink pilot signal within the special downlink subframe and enable the configuration of the pilot signal to meet more requirements.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
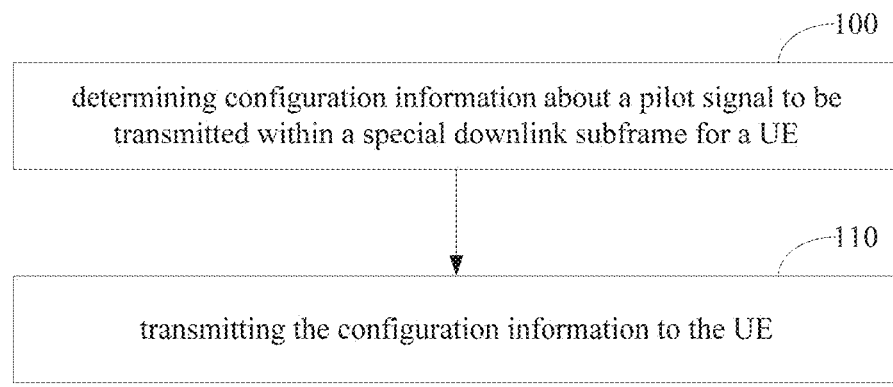
FIG. 1 is a flow chart of a pilot signal configuration method according to one embodiment of the present disclosure.

As shown in FIG. 1, the present disclosure provides in some embodiments a pilot signal configuration method at a base station side, which includes the following steps.

Step 100: determining configuration information about a pilot signal to be transmitted within a special downlink subframe for a UE. In a possible embodiment of the present disclosure, the special downlink subframe may include, but not limited to, a DwPTS, and the pilot signal may include, but not limited to, a CSI-RS.

Step 110: transmitting the configuration information to the UE.

According to the pilot signal configuration method in the embodiments of the present disclosure, it is able to achieve the configuration of the pilot signal to be transmitted within the special downlink subframe, thereby to transmit downlink pilot signal within the special downlink subframe and enable the configuration of the pilot signal to meet more requirements.

The configuration information about the pilot signal may include indices, transmission periods, subframe offsets and ports of the pilot signal. Correspondingly, the configuration information about the pilot signal determined in Step 100 at least includes the indices of the pilot signal, each of all or parts of the indices of the pilot signal corresponds to a group of resource elements (REs) for transmitting the pilot signal within the special downlink subframe, and the indices of the pilot signal correspond to different REs.

In the embodiments of the present disclosure, the REs corresponding to each of the indices of the pilot signal to be transmitted within the special downlink subframe may be identical to, or different from, the REs corresponding to each index of a pilot signal to be transmitted within a normal downlink subframe, which will not be particularly defined herein.

In a possible embodiment of the present disclosure, the configuration information about the pilot signal determined in Step 100 may further include the ports, transmission periods and/or subframe offsets of the pilot signal. In the case that the ports, transmission periods and/or subframe offsets of the pilot signal are fixed or do not change in the current configuration, it is merely necessary to determine the indices of the pilot signal in Step 100.

Based on the above, the configuration information about the pilot signal to be transmitted within the special downlink subframe may be transmitted via signaling identical to, or different from, the configuration information about the pilot signal to be transmitted within the normal downlink subframe. Correspondingly, Step 110 may be implemented in the following modes.

First mode of Step 110: transmitting second pilot signal configuration signaling different from first pilot signal configuration signaling to the UE. The first pilot signal configuration signaling carries configuration information about the pilot signal to be transmitted within the normal downlink subframe. And the second pilot signal configuration signaling carries the configuration information about the pilot signal to be transmitted within the special downlink subframe.

During the implementation, the pilot signal to be transmitted within the normal downlink subframe or the pilot signal to be transmitted within the special downlink subframe may be configured for one UE. The configuration information about the pilot signal to be transmitted within the normal downlink subframe may be transmitted via the first pilot signal configuration signaling, and the configuration information about the pilot signal to be transmitted within the special downlink subframe may be transmitted via the second pilot signal configuration signaling. The transmission period of each pilot signal to be transmitted within the normal downlink subframe may be identical to, or different from, the transmission period of each pilot signal to be transmitted within the special downlink subframe. In a possible embodiment of the present disclosure, merely the pilot signal to be transmitted within the normal downlink subframe may be configured for one UE, and the configuration information about the pilot signal to be transmitted within the normal downlink subframe may be transmitted via the first pilot signal configuration signaling. In another possible embodiment of the present disclosure, merely the pilot signal to be transmitted within the special downlink subframe may be configured for one UE, and the configuration information about the pilot signal to be transmitted within the special downlink subframe may be transmitted via the second pilot signal configuration signaling.

Based on the above Mode 1, in order to enable the UE to identify whether or not the received pilot signal configuration signaling is the first pilot signal configuration signaling or the second pilot signal configuration signaling, in a possible embodiment of the present disclosure, the second pilot signal configuration signaling further carries indication information for indicating the pilot signal corresponding to the configuration information about the pilot signal to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

It should be appreciated that, the UE may identify whether the received pilot signal configuration signaling is the first pilot signal configuration signaling or the second pilot signal configuration signaling in any other ways, which will not be particularly defined herein.

Mode 2 of Step 110: transmitting third pilot signal configuration signaling to the UE. The third pilot signal configuration signaling carries configuration information determined for the UE, and the configuration information determined for the UE may include the first configuration information or the second configuration information.

The configuration information may further include third configuration information. At this time, the first configuration information, the second configuration information and the third configuration information are transmitted via the third pilot signal configuration signaling.

The first configuration information indicates that the pilot signal is to be transmitted within both the normal downlink subframe and the special downlink subframe. The second configuration information indicates that the pilot signal is to be transmitted within the special downlink subframe rather than the normal downlink subframe, i.e., with respect to a conventional frame structure, the second configuration information indicates that the pilot signal is to be transmitted merely within the special downlink subframe. The third configuration information indicates that the pilot signal is to be transmitted within the normal downlink subframe rather than the special downlink subframe, i.e., with respect to the conventional frame structure, the third configuration information indicates that the pilot signal is to be transmitted merely within the normal downlink subframe.

It should be appreciated that, in the embodiments of the present disclosure, such words as "first", "second" and "third" preceding the pilot signal configuration signaling are merely used to differentiate the types of pilot signal configuration signaling, rather than to show any order or sequence. In addition, such words as first", "second" and "third" preceding the configuration information are merely used to differentiate the types of the downlink subframes within which the corresponding pilot signal is to be transmitted, rather than to show any order or sequence.

During the implementation, in the case of configuring the pilot signal for the UE, the transmission periods and/or subframe offsets of the pilot signal may be adjusted, so as to determine the downlink subframes within which the pilot signal is to be transmitted. Correspondingly, in Step 100, the first configuration information about the pilot signal may be determined for the UE, i.e., the pilot signal may be transmitted within both the normal downlink subframe and the special downlink subframe. To be specific, the transmission periods and/or subframe offsets of the pilot signal may be adjusted in such a manner that the pilot signal is transmitted within the normal downlink subframe in some transmission periods, and transmitted within the special downlink subframe in some other transmission periods. In another possible embodiment of the present disclosure, in Step 100, the second configuration information about the pilot signal may be determined for the UE, i.e., the pilot signal may be transmitted merely within the special downlink subframe. To be specific, the transmission periods and/or subframe offsets of the pilot signal may be adjusted in such a manner that the pilot signal is transmitted within the special downlink subframe in all the transmission periods. Of course, the third configuration information about the pilot signal may also be determined for the UE, i.e., the pilot signal may be transmitted merely within the normal downlink subframe.

Figure 2:
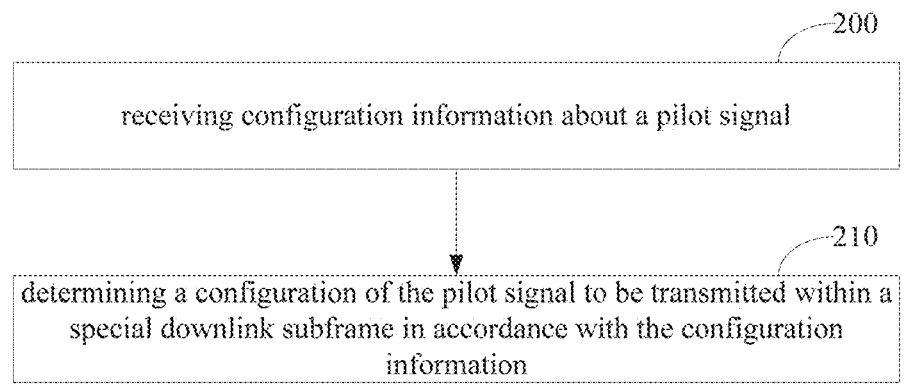
FIG. 2 is a flow chart of another pilot signal configuration method according to one embodiment of the present disclosure.

As shown in FIG. 2, the present disclosure provides in some embodiments a pilot signal configuration method at a UE side, which includes: Step 200 of receiving configuration information about a pilot signal; and Step 210 of determining a configuration of the pilot signal to be transmitted within a special downlink subframe in accordance with the configuration information.

According to the pilot signal configuration method in the embodiments of the present disclosure, it is able to achieve the configuration of the pilot signal to be transmitted within the special downlink subframe, thereby to transmit downlink pilot signal within the special downlink subframe and enable the configuration of the pilot signal to meet more requirements.

The interpretations on the configuration information about the pilot signal may refer to those mentioned above, and thus will not be particularly defined herein.

Based on the above, the configuration information about the pilot signal to be transmitted within the special downlink subframe may be transmitted via signaling identical to, or different from, the configuration information about the pilot signal to be transmitted within a normal downlink subframe. Correspondingly, Step 200 may be implemented in the following modes.

Mode 1 of Step 200: receiving second pilot signal configuration signaling different from first pilot signal configuration signaling. The first pilot signal configuration signaling carries configuration information about the pilot signal to be transmitted within a normal downlink subframe, and the second pilot signal configuration signaling carries the configuration information about the pilot signal to be transmitted within the special downlink subframe.

Based on the above Mode 1, in order to identify whether the received pilot signal configuration signaling is the first pilot signal configuration signaling or the second pilot signal configuration signaling, in a possible embodiment of the present disclosure, the second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe. Correspondingly, the step of receiving the second pilot signal configuration signaling different from the first pilot signal configuration signaling includes: receiving pilot signal configuration signaling; and determining the pilot signal configuration signaling as the second pilot signal configuration signaling different from the first pilot signal configuration signaling in accordance with indication information carried in the received pilot signal configuration signaling.

It should be appreciated that, whether the received pilot signal configuration signaling is the first pilot signal configuration signaling or the second pilot signal configuration signaling may also be identified in any other ways, which will not be particularly defined herein.

Mode 2 of Step 200: receiving third pilot signal configuration signaling. The third pilot signal configuration signaling carries configuration information determined for a current UE, the configuration information determined for the current UE includes first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe. It should be appreciated that, the configuration information determined for the current UE may further include third configuration information. At this time, the first configuration information, the second configuration information and the third configuration information are transmitted via the third pilot signal configuration signaling. The third configuration information indicates that the pilot signal is to be transmitted within the normal downlink subframe rather than the special downlink subframe.

Based on the above Mode 2 of Step 200, in a possible embodiment of the present disclosure, Step 210 may include: in the case that the configuration information is the first configuration information, searching for the resource elements corresponding to indices of the pilot signal carried in the first configuration information and configured to transmit the pilot signal within the special downlink subframe, in the case that no resource element has been searched, determining that the first configuration information is invalid or determining that the configuration of the pilot signal to be transmitted within the normal downlink subframe is valid while the configuration of the pilot signal to be transmitted within the special downlink subframe is invalid; and in the case that the configuration information is the second configuration information, searching for the resource elements corresponding to the indices of the pilot signal carried in the second configuration information and configured to transmit the pilot signal within the special downlink subframe, and in the case that no resource element has been searched, determining that the second configuration information is invalid.

The present disclosure will be described hereinafter in more details by taking the configuration of the CSI-RS as an example.

Figure 3A:
FIGS. 3A through 3C are schematic views showing different pilot patterns of a CSI-RS to be transmitted within a normal downlink subframe according to embodiments of the present disclosure.
Figure 3B:
Figure 3C:
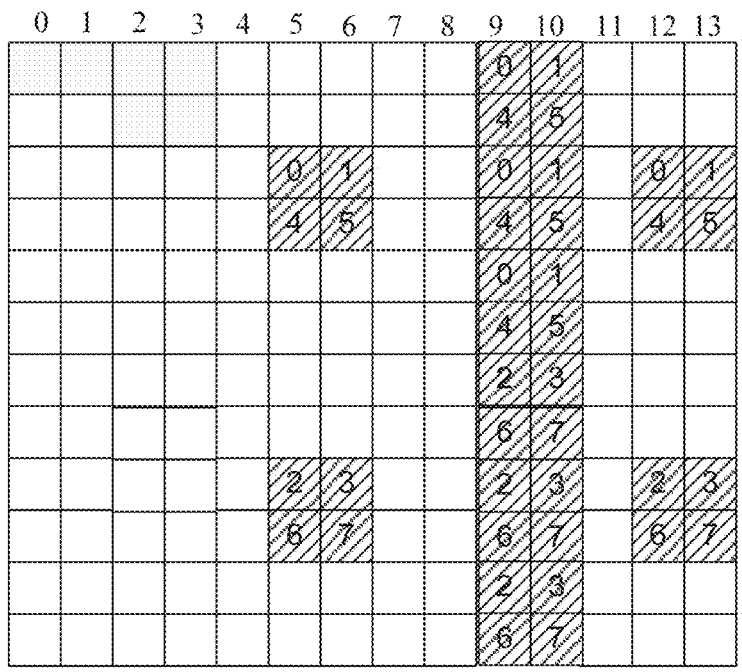

In a possible embodiment of the present disclosure, FIG. 3A shows a pilot pattern of the 2-port CSI-RS to be transmitted within the normal downlink subframe. FIG. 3B shows a pilot pattern of the 4-port CSI-RS to be transmitted within the normal downlink subframe, and FIG. 3C shows a pilot pattern of the 8-port CSI-RS to be transmitted within the normal downlink subframe. Table 1 shows a correspondence between the indices of the CSI-RS and the REs.

TABLE 1

| | | Number of ports of CSI-RS | | | | | |
| | | 1 or 2 | | 4 | | 8 | |
| | CSI-RS indices | (k', l') | $n_s$ mod 2 | (k', l') | $n_s$ mod 2 | (k', l') | $n_s$ mod 2 |
| --- | --- | --- | --- | --- | --- | --- | --- |
| Frame structures | 0 | (9, 5) | 0 | (9, 5) | 0 | (9, 5) | 0 |
| 1 and 2 | 1 | (11, 2) | 1 | (11, 2) | 1 | (11, 2) | 1 |

TABLE 1-continued

| | | Number of ports of CSI-RS | | | | | |
|---|---|---|---|---|---|---|---|
| | | 1 or 2 | | 4 | | 8 | |
| | CSI-RS indices | (k', l') | $n_s$ mod 2 | (k', l') | $n_s$ mod 2 | (k', l') | $n_s$ mod 2 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Merely frame structure 2 | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In Table 1, in the case that $n_s$ mod 2 is 0, it represents a first time slot in the pilot pattern, and in the case that $n_s$ mod 2 is 1, it represents a second time slot in the pilot pattern. In addition, k' represents a $(k')^{th}$ row in the pilot pattern, and l' represents an $(l')^{th}$ column of a corresponding time slot in the pilot pattern. For example, in the case that $n_s$ mod 2 is 0, k' is 9 and l' is 5, it represents REs corresponding to a fifth column of a first time slot in a ninth row.

The CSI-RS indices 0 to 19 are applicable to both frame structures 1 and 2, while the CSI-RS indices 20 to 31 are merely applicable to the frame structure 2.

Figure 4:
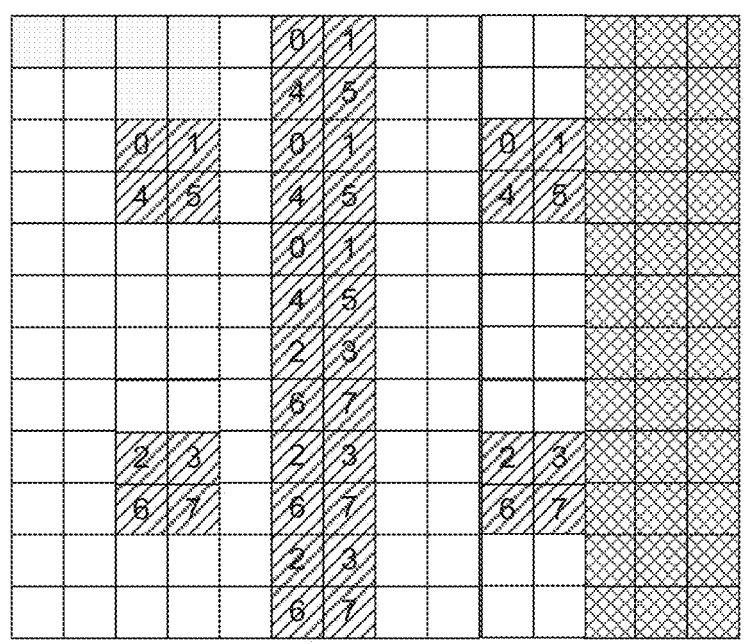
FIG. 4 is a schematic view showing another pilot pattern of the CSI-RS to be transmitted within DwPTSs having lengths of 11 and 12 symbols according to one embodiment of the present disclosure.
Figure 5:
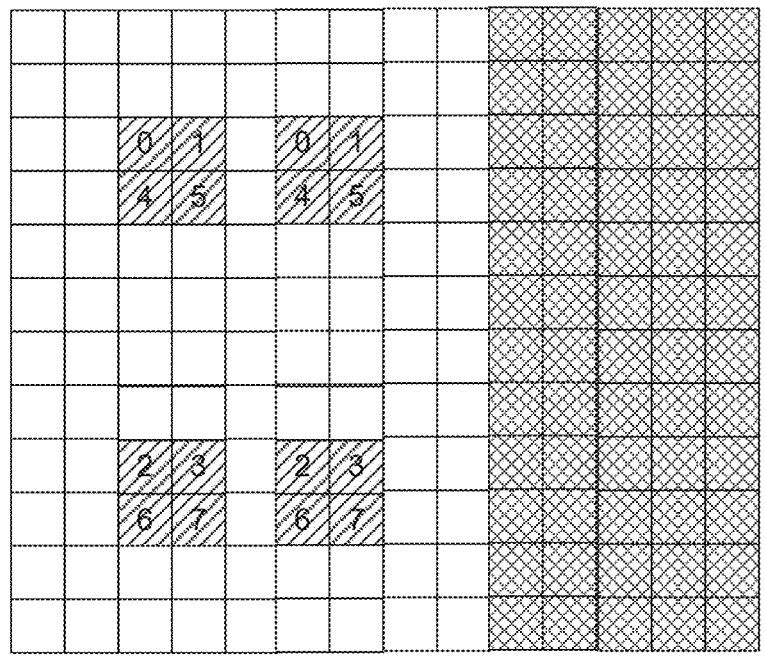
FIG. 5 is another schematic view showing another pilot pattern of the CSI-RS to be transmitted within the DwPTSs having lengths of 9 and 10 symbols according to one embodiment of the present disclosure.

In the embodiment of the present disclosure, in the case that the DwPTS has a length of 11 or 12 symbols, FIG. 4 shows the pilot pattern of the 2-port CSI-RS to be transmitted within the DwPTS, and Table 2 shows a correspondence between the indices of the CSI-RS and the REs. In the case that the DwPTS has a length of 9 or 10 symbols, FIG. 5 shows the pilot pattern of the 2-port CSI-RS to be transmitted within the DwPTS, and Table 3 shows a correspondence between the CSI-RS indices and the REs.

TABLE 2

| | | Number of ports of CSI-RS | | | | | |
|---|---|---|---|---|---|---|---|
| | | 1 or 2 DwPTS having a length of 11 or 12 symbols | | 4 DwPTS having a length of 11 or 12 symbols | | 8 DwPTS having a length of 11 or 12 symbols | |
| | CSI-RS indices | (k', l') | $n_s$ mod 2 | (k', l') | $n_s$ mod 2 | (k', l') | $n_s$ mod 2 |
| Frame structures 1 and 2 | 0 | (9, 2) | 0 | (9, 2) | 0 | (9, 2) | 0 |
| | 1 | (11, 5) | 0 | (11, 5) | 0 | (11, 5) | 0 |
| | 2 | (9, 5) | 0 | (9, 5) | 0 | (9, 5) | 0 |
| | 3 | (7, 5) | 0 | (7, 5) | 0 | (7, 5) | 0 |
| | 4 | (9, 2) | 1 | (9, 2) | 1 | (9, 2) | 1 |
| | 5 | (8, 2) | 0 | (8, 2) | 0 | | |
| | 6 | (10, 5) | 0 | (10, 5) | 0 | | |
| | 7 | (8, 5) | 0 | (8, 5) | 0 | | |
| | 8 | (6, 5) | 0 | (6, 5) | 0 | | |
| | 9 | (8, 2) | 1 | (8, 2) | 1 | | |
| | 10 | (3, 2) | 0 | | | | |
| | 11 | (2, 2) | 0 | | | | |
| | 12 | (5, 5) | 0 | | | | |
| | 13 | (4, 5) | 0 | | | | |
| | 14 | (3, 5) | 0 | | | | |

TABLE 2-continued

|  | | Number of ports of CSI-RS | | | | |
|---|---|---|---|---|---|---|
|  | | 1 or 2 DwPTS having a length of 11 or 12 symbols | | 4 DwPTS having a length of 11 or 12 symbols | | 8 DwPTS having a length of 11 or 12 symbols |
| CSI-RS indices | (k', l') | $n_s$ mod 2 | (k', l') | $n_s$ mod 2 | (k', l') | $n_s$ mod 2 |
| 15 | (2, 5) | 0 | | | | |
| 16 | (1, 5) | 0 | | | | |
| 17 | (0, 5) | 0 | | | | |
| 18 | (3, 2) | 1 | | | | |
| 19 | (2, 2) | 1 | | | | |

TABLE 3

|  |  | 1 or 2 DwPTS having a length of 9 or 10 symbols | | Number of ports of CSI-RS | | | |
|---|---|---|---|---|---|---|---|
|  |  | | | 4 DwPTS having a length of 9 or 10 symbols | | 8 DwPTS having a length of 9 or 10 symbols | |
|  | CSI-RS indices | (k', l') | $n_s$ mod 2 | (k', l') | $n_s$ mod 2 | (k', l') | $n_s$ mod 2 |
| Frame structures 1 and 2 | 0 | (9, 2) | 0 | (9, 2) | 0 | (9, 2) | 0 |
|  | 1 | (9, 5) | 0 | (9, 5) | 0 | (9, 5) | 0 |
|  | 2 | (8, 2) | 0 | (8, 2) | 0 | | |
|  | 3 | (8, 5) | 0 | (8, 5) | 0 | | |
|  | 4 | (3, 2) | 0 | | | | |
|  | 5 | (2, 2) | 0 | | | | |
|  | 6 | (3, 5) | 0 | | | | |
|  | 7 | (2, 5) | 0 | | | | |
|  | 8 | | | | | | |
|  | 9 | | | | | | |
|  | 10 | | | | | | |
|  | 11 | | | | | | |
|  | 12 | | | | | | |
|  | 13 | | | | | | |
|  | 14 | | | | | | |
|  | 15 | | | | | | |
|  | 16 | | | | | | |
|  | 17 | | | | | | |
|  | 18 | | | | | | |
|  | 19 | | | | | | |

Based on the above-mentioned tables and pilot patterns, the base station may determine for the UE the configuration information about the CSI-RS to be transmitted within the special downlink subframe, and determine for the UE the configuration information about the CSI-RS to be transmitted within the normal downlink subframe. The determined configuration information may include the indices, ports, transmission periods and subframe offsets of the CSI-RS.

In the embodiment of the present disclosure, the indices, ports, transmission periods and subframe offsets of the CSI-RS to be transmitted within the special downlink subframe may be identical to, or different from, those of the CSI-RS to be transmitted within the normal downlink subframe.

The base station may transmit to the UE the first pilot signal configuration signaling carrying the configuration information about the CSI-RS to be transmitted within the normal downlink subframe and the second pilot signal configuration signaling carrying the configuration information about the CSI-RS to be transmitted within the special downlink subframe.

The UE may receive the first pilot signal configuration signaling and the second pilot signal configuration signaling.

The UE may then look up Table 1 in accordance with the indices and ports of the CSI-RS carried in the first pilot signal configuration signaling, so as to determine the REs occupied by the CSI-RS to be transmitted within the normal downlink subframe. For example, in the case that the index of the CSI-RS is 0 and the number of ports is 2, it is able to determine, in accordance with Table 1, that the REs corresponding to a ninth subcarrier and a fifth symbol and a sixth symbol in a first time slot within the normal downlink subframe are occupied by the CSI-RS to be transmitted within the normal downlink subframe. In addition, the UE may determine the transmission periods and the subframe offsets of the CSI-RS to be transmitted within the normal downlink subframe in accordance with the other configuration information carried in the first pilot signal configuration signaling.

In the case that the DwPTS has a length of 11 or 12 symbols, the UE may look up Table 2 in accordance with the indices and the ports of the CSI-RS carried in the second pilot signal configuration signaling, so as to determine the REs occupied by the CSI-RS to be transmitted within the DwPTS. For example, in the case that the index of the CSI-RS is 0 and the number of ports is 2, it is able to determine, in accordance with Table 2, that the REs corresponding to a ninth subcarrier and a second symbol and a third symbol in a first time slot within the DwPTS are occupied by the CSI-RS to be transmitted within the DwPTS. In addition, the UE may determine the transmission periods and the subframe offsets of the CSI-RS to be transmitted within the DwPTS in accordance with the other configuration information carried in the second pilot signal configuration signaling.

The above description has been given by taking 2, 4 and 8 ports as an example with reference to Tables 1-3. It should be appreciated that, the method in the present disclosure may also be applied to the situation where more ports are involved.

In addition, in a possible embodiment of the present disclosure, the base station may configure the CSI-RS to be transmitted within the normal downlink subframe and the CSI-RS to be transmitted within the DwPTS for the UE. However, in actual use, the base station may merely configure the CSI-RS to be transmitted within the DwPTS for the UE in a manner as mentioned above.

In a possible embodiment of the present disclosure, FIG. 3A shows the pilot pattern of the 2-port CSI-RS to be transmitted within the normal downlink subframe. FIG. 3B shows the pilot pattern of the 4-port CSI-RS to be transmitted within the normal downlink subframe. And FIG. 3C shows the pilot pattern of the 8-port CSI-RS to be transmitted within the normal downlink subframe.

Taking the 2-port CSI-RS as an example, in the case that the DwPTS has a length of 11 or 12 symbols, FIG. 4 shows the pilot pattern of the 2-port CSI-RS to be transmitted within the DwPTS, and Table 4 shows a correspondence between the indices of the CSI-RS and the REs. In the case that the DwPTS has a length of 9 or 10 symbols. FIG. 5 shows the pilot pattern of the 2-port CSI-RS to be transmitted within the DwPTS, and Table 5 shows a correspondence between the indices of the CSI-RS and the REs. It should be appreciated, for the 4-port or 8-port CSI-RS, the correspondence between its indices and the REs may refer to the above Tables 1, 2 and 3.

TABLE 4

| | | 1 or 2 Normal downlink subframe | | Number of ports of CSI-RS DwPTS having a length of 11 or 12 symbols | |
|---|---|---|---|---|---|
| | CSI-RS indices | (k', l') | $n_s$ mod 2 | (k', l') | $n_s$ mod 2 |
| Frame structures 1 and 2 | 0 | (9, 5) | 0 | (9, 2) | 0 |
| | 1 | (11, 2) | 1 | (11, 5) | 0 |
| | 2 | (9, 2) | 1 | (9, 5) | 0 |
| | 3 | (7, 2) | 1 | (7, 5) | 0 |
| | 4 | (9, 5) | 1 | (9, 2) | 1 |
| | 5 | (8, 5) | 0 | (8, 2) | 0 |
| | 6 | (10, 2) | 1 | (10, 5) | 0 |
| | 7 | (8, 2) | 1 | (8, 5) | 0 |
| | 8 | (6, 2) | 1 | (6, 5) | 0 |
| | 9 | (8, 5) | 1 | (8, 2) | 1 |
| | 10 | (3, 5) | 0 | (3, 2) | 0 |
| | 11 | (2, 5) | 0 | (2, 2) | 0 |
| | 12 | (5, 2) | 1 | (5, 5) | 0 |
| | 13 | (4, 2) | 1 | (4, 5) | 0 |
| | 14 | (3, 2) | 1 | (3, 5) | 0 |
| | 15 | (2, 2) | 1 | (2, 5) | 0 |
| | 16 | (1, 2) | 1 | (1, 5) | 0 |
| | 17 | (0, 2) | 1 | (0, 5) | 0 |
| | 18 | (3, 5) | 1 | (3, 2) | 1 |
| | 19 | (2, 5) | 1 | (2, 2) | 1 |

TABLE 5

| | | 1 or 2 Normal downlink subframe | | Number of ports of CSI-RS DwPTS having a length of 9 or 10 symbols | |
|---|---|---|---|---|---|
| | CSI-RS indices | (k', l') | $n_s$ mod 2 | (k', l') | $n_s$ mod 2 |
| Frame structures 1 and 2 | 0 | (9, 5) | 0 | (9, 2) | 0 |
| | 1 | (11, 2) | 1 | | |
| | 2 | (9, 2) | 1 | | |
| | 3 | (7, 2) | 1 | | |
| | 4 | (9, 5) | 1 | (9, 5) | 0 |
| | 5 | (8, 5) | 0 | (8, 2) | 0 |
| | 6 | (10, 2) | 1 | | |
| | 7 | (8, 2) | 1 | | |
| | 8 | (6, 2) | 1 | | |
| | 9 | (8, 5) | 1 | (8, 5) | 0 |
| | 10 | (3, 5) | 0 | (3, 2) | 0 |
| | 11 | (2, 5) | 0 | (2, 2) | 0 |
| | 12 | (5, 2) | 1 | | |
| | 13 | (4, 2) | 1 | | |
| | 14 | (3, 2) | 1 | | |
| | 15 | (2, 2) | 1 | | |
| | 16 | (1, 2) | 1 | | |
| | 17 | (0, 2) | 1 | | |
| | 18 | (3, 5) | 1 | (3, 5) | 0 |
| | 19 | (2, 5) | 1 | (2, 5) | 0 |

The base station may configure for the UE the configuration information about the CSI-RS, i.e., the indices, the ports, the transmission periods and the subframe offsets of the CSI-RS, and transmit the determined configuration information to the UE via the third pilot signal configuration signaling.

The UE may receive the third pilot signal configuration signaling, and determine whether or not the CSI-RS is to be transmitted within the normal downlink subframe, the DwPTS, or both, in accordance with transmission periods and the subframe offsets of the CSI-RS.

In the case that the CSI-RS is to be transmitted within both the normal downlink subframe and the DwPTS, the UE may then determine the REs corresponding to the CSI-RS within the normal downlink subframe and the DwPTS in accordance with the indices and ports of the CSI-RS. Taking the 1-port or 2-port CSI-RS in Table 4 as an example, in the case that the CSI-RS index is 0, a position (k',l') of the RE corresponding to the CSI-RS to be transmitted within the DwPTS may be (9,2), and a position (k',l') of the RE corresponding to the CSI-RS to be transmitted within the normal downlink subframe may be (9.5).

In the case that the CSI-RS is to be transmitted merely within the normal downlink subframe, an implementation mode thereof may be identical to that known in the art, and thus will not be particularly defined herein.

In the case that the CSI-RS is to be transmitted merely within the DwPTS, the UE may determine the REs corresponding to the CSI-RS within the DwPTS in accordance with the indices and ports of the CSI-RS. Taking the 1-port or 2-port CSI-RS in Table 5 as an example, in the case that the index of the CSI-RS is 0, a position (k',l') of the RE corresponding to the CSI-RS to be transmitted within the DwPTS may be (9,2).

As shown in Tables 4 and 5, in the case that the DwPTS has a small length, there may be a small number of ports of the CSI-RS capable of being discovered, and at this time, merely a part of the CSI-RS indices are valid. For example, for the 1-port or 2-port CSI-RS, the valid indices may be 0, 4, 5, 9, 10, 11, 18 and 19. For the 4-port CSI-RS, the valid indices may be 0, 4, 5 and 9, and for the 8-port CSI-RS, the valid indices may be 0 and 4. In the embodiments of the present disclosure, the number of the valid CSI-RS indices within the DwPTS is smaller than that within the normal downlink subframe. In the case that the base station configures the CSI-RS for the UE, there may exist the following situations.

In a first situation where the base station has configured the transmission periods and the subframe offsets of the CSI-RS and the CSI-RS is merely within the normal downlink subframe, the UE may perform the operations in a manner identical to an earlier version of the UE.

In a second situation where the base station has configured the transmission periods and the subframe offsets of the CSI-RS and the CSI-RS is merely within the DwPTS, in the case that the CSI-RS index is invalid (e.g., the index "1" is configured by the base station for the 1-port or 2-port CSI-RS), the UE may determine that an error configuration occurs.

In a third situation where the base station has configured the transmission periods and the subframe offsets of the CSI-RS and the CSI-RS is within both the normal downlink subframe and DwPTS, in the case that the CSI-RS index within the DwPTS is invalid (e.g., the index "1" is configured by the base station for the 1-port or 2-port CSI-RS), the UE may determine that the configuration is erroneous completely or the CSI-RS within the normal downlink subframe is valid.

Figure 6:
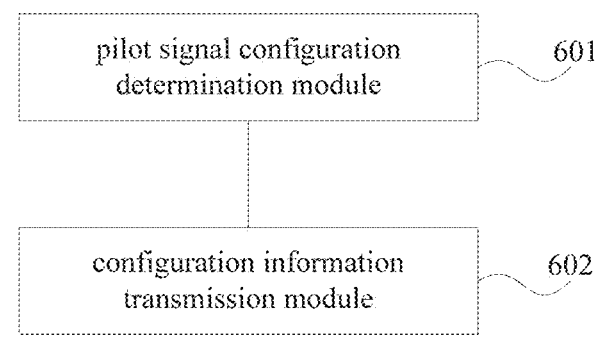
FIG. 6 is a schematic view showing a pilot signal configuration device according to one embodiment of the present disclosure.

Based on an identical inventive concept, the present disclosure further provides in some embodiments a pilot signal configuration device which, as shown in FIG. 6, includes: a pilot signal configuration determination module 601 configured to determine configuration information about a pilot signal to be transmitted within a special downlink subframe for a UE; and a configuration information transmission module 602 configured to transmit the configuration information to the UE.

According to the embodiments of the present disclosure, it is able to achieve the configuration of the pilot signal to be transmitted within the special downlink subframe, thereby to transmit downlink pilot signal within the special downlink subframe and enable the configuration of the pilot signal to meet more requirements.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the configuration information transmission module is further configured to transmit second pilot signal configuration signaling different from first pilot signal configuration signaling to the UE, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the pilot signal configuration determination module is further configured to determine first configuration information about the pilot signal for the UE, the first configuration information indicating that the pilot signal is to be transmitted within both a normal downlink subframe and the special downlink subframe, or determine second configuration information about the pilot signal for the UE, the second configuration information indicating that the pilot signal is to be transmitted within the special downlink subframe rather than the normal downlink subframe.

In a possible embodiment of the present disclosure, the configuration information transmission module is further configured to transmit third pilot signal configuration signaling to the UE, the third pilot signal configuration signaling carries configuration information determined for the UE, and the configuration information determined for the UE includes the first configuration information or the second configuration information.

Figure 7:
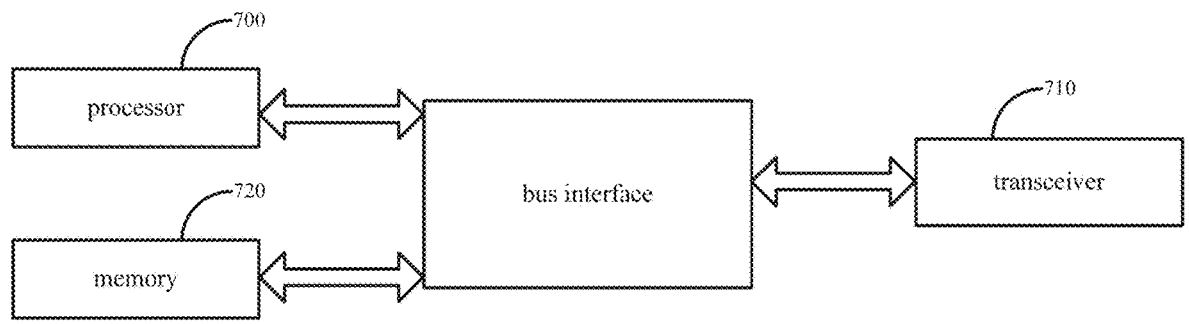
FIG. 7 is a schematic view showing a base station according to one embodiment of the present disclosure.

Based on an identical inventive concept, the present disclosure further provides in some embodiments a base station which, as shown in FIG. 7, includes a processor 700, a memory 720 and a transceiver 710. The processor 700 is configured to read programs stored in the memory 720, so as to determine configuration information about a pilot signal to be transmitted within a special downlink subframe for a UE, and transmit through the transceiver 710 the configuration information to the UE. The transceiver 710 is configured to receive and transmit data under the control of the processor 700. The memory 720 is configured to store therein data for the operation of the processor 700.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. Bus interfaces are provided, and the transceiver 710 may consist of a plurality of elements, i.e., a transmitter and a receiver for communication with any other devices over a transmission medium. The processor 700 may take charge of managing the bus architecture as well as general processings. The memory 720 may store data desired for the operation of the processor 700.

According to the embodiments of the present disclosure, it is able to achieve the configuration of the pilot signal to be transmitted within the special downlink subframe, thereby to transmit downlink pilot signal within the special downlink subframe and enable the configuration of the pilot signal to meet more requirements.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the processor is further configured to read the programs stored in the memory, so as to transmit second pilot signal configuration signaling different from first pilot signal configuration signaling to the UE, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the processor is further configured to read the programs stored in the memory, so as to determine first configuration information about the pilot signal for the UE, the first configuration information indicating that the pilot signal is to be transmitted within both a normal downlink subframe and the special downlink subframe, or determine second configuration information about the pilot signal for the UE, the second configuration information indicating that the pilot signal is to be transmitted within the special downlink subframe rather than the normal downlink subframe.

In a possible embodiment of the present disclosure, the processor is further configured to read the programs stored in the memory, so as to transmit third pilot signal configuration signaling to the UE, the third pilot signal configuration signaling carries configuration information determined for the UE, and the configuration information determined for the UE includes the first configuration information or the second configuration information.

Figure 8:
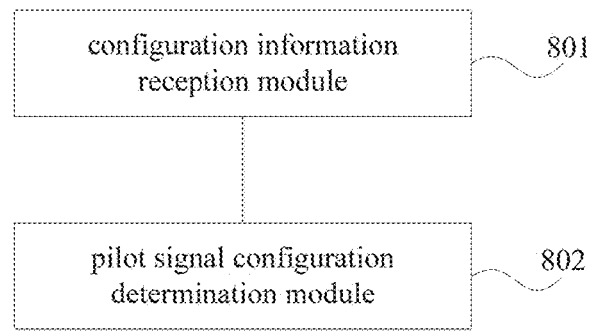
FIG. 8 is a schematic view showing another pilot signal configuration device according to one embodiment of the present disclosure.

Based on an identical inventive concept, the present disclosure further provides in some embodiments a pilot signal configuration device which, as shown in FIG. 8, includes: a configuration information reception module 801 configured to receive configuration information about a pilot signal; and a pilot signal configuration determination module 802 configured to determine a configuration of the pilot signal to be transmitted within a special downlink subframe in accordance with the configuration information.

According to the embodiments of the present disclosure, it is able to achieve the configuration of the pilot signal to be transmitted within the special downlink subframe, thereby to transmit downlink pilot signal within the special downlink subframe and enable the configuration of the pilot signal to meet more requirements.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the configuration information reception module is further configured to receive second pilot signal configuration signaling different from first pilot signal configuration signaling, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the configuration information reception module is further configured to: receive pilot signal configuration signaling; and determine the pilot signal configuration signaling as the second pilot signal configuration signaling different from the first pilot signal configuration signaling in accordance with indication information carried in the received pilot signal configuration signaling. The second pilot signal configuration signaling further carries indication information for indicating the pilot signal corresponding to the configuration information about the pilot signal to be transmitted within the special downlink subframe to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the configuration information reception module is further configured to receive third pilot signal configuration signaling. The third pilot signal configuration signaling carries configuration information determined for a current UE, the configuration information determined for the current UE includes first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe.

In a possible embodiment of the present disclosure, the pilot signal configuration determination module is further configured to: in the case that the configuration information is the first configuration information, search for the resource elements corresponding to indices of the pilot signal carried in the first configuration information and configured to transmit the pilot signal within the special downlink subframe, in the case that no resource element has been searched, determine that the first configuration information is invalid or determine that the configuration of the pilot signal to be transmitted within the normal downlink subframe is valid while the configuration of the pilot signal to be transmitted within the special downlink subframe is invalid; and in the case that the configuration information is the second configuration information, search for the resource elements corresponding to the indices of the pilot signal carried in the second configuration information and configured to transmit the pilot signal within the special downlink subframe, and in the case that no resource element has been searched, determine that the second configuration information is invalid.

Figure 9:
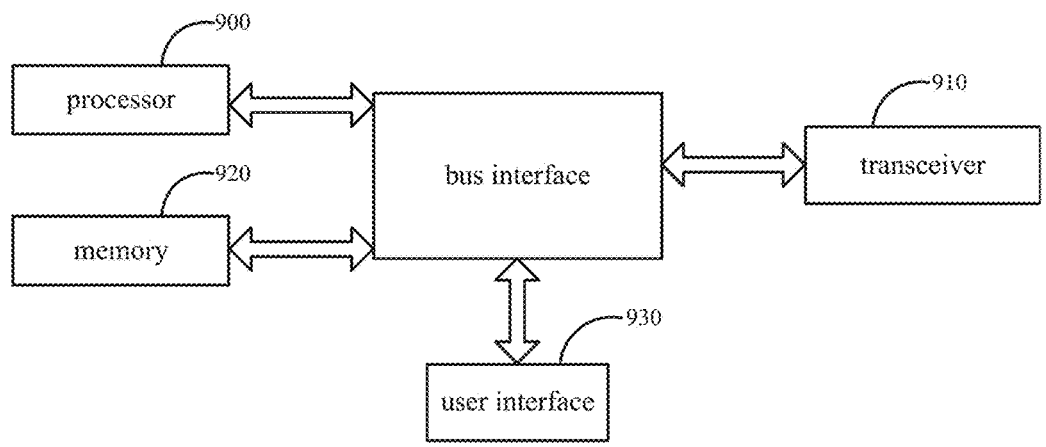
FIG. 9 is a schematic view showing a UE according to one embodiment of the present disclosure.

Based on an identical inventive concept, the present disclosure further provides in some embodiments a UE which, as shown in FIG. 9, includes a processor 900, a memory 920 and a transceiver 910. The processor 900 is configured to read programs stored in the memory 920, so as to receive through the transceiver 910 configuration information about a pilot signal, and determine a configuration of the pilot signal to be transmitted within a special downlink subframe in accordance with the configuration information. The transceiver 910 is configured to receive and transmit data under the control of the processor 900. The memory 920 is configured to store therein data for the operation of the processor 900.

In FIG. 9, bus architecture may include a number of buses and bridges connected to each other, so as to connect various circuits for one or more processors 900 and one or more memories 920. In addition, as is known in the art, the bus architecture may be used to connect any other circuits, such as a circuit for a peripheral device, a circuit for a voltage stabilizer and a power management circuit. Bus interfaces are provided, and the transceiver 910 may consist of a plurality of elements, i.e., a transmitter and a receiver for communication with any other devices over a transmission medium. With respect to different UEs, a user interface 930 may also be provided for devices which are to be arranged inside or outside the UE, and these devices may include but not limited to a keypad, a display, a speaker, a microphone and a joystick. The processor 900 may take charge of managing the bus architecture as well as general processings. The memory 920 may store therein data for the operation of the processor 900.

According to the embodiments of the present disclosure, it is able to achieve the configuration of the pilot signal to be transmitted within the special downlink subframe, thereby to transmit downlink pilot signal within the special downlink subframe and enable the configuration of the pilot signal to meet more requirements.

In a possible embodiment of the present disclosure, the configuration information about the pilot signal includes indices of the pilot signal, each of all or parts of the indices of the pilot signal corresponds to a group of resource elements for transmitting the pilot signal within the special downlink subframe, and the indices of the pilot signal correspond to different resource elements.

In a possible embodiment of the present disclosure, the processor is further configured to read the programs stored in the memory, so as to receive second pilot signal configuration signaling different from first pilot signal configuration signaling, the first pilot signal configuration signaling carries configuration information about the pilot signal to be transmitted within a normal downlink subframe, and the second pilot signal configuration signaling carries the configuration information about the pilot signal to be transmitted within the special downlink subframe.

In a possible embodiment of the present disclosure, the processor is further configured to read the programs stored in the memory, so as to: receive pilot signal configuration signaling; and determine the pilot signal configuration signaling as the second pilot signal configuration signaling different from the first pilot signal configuration signaling in accordance with indication information carried in the received pilot signal configuration signaling. The second pilot signal configuration signaling further carries indication information for indicating the pilot signal corresponding to the configuration information about the pilot signal to be transmitted within the special downlink subframe. The first pilot signal configuration signaling further carries indication information for indicating the pilot signal corresponding to the configuration information about the pilot signal to be transmitted within the normal downlink subframe to be transmitted within the normal downlink subframe.

In a possible embodiment of the present disclosure, the processor is further configured to read the programs stored in the memory, so as to receive third pilot signal configuration signaling. The third pilot signal configuration signaling carries configuration information determined for a current UE, the configuration information determined for the current UE includes first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe.

In a possible embodiment of the present disclosure, the processor is further configured to read the programs stored in the memory, so as to: in the case that the configuration information is the first configuration information, search for the resource elements corresponding to indices of the pilot signal carried in the first configuration information and configured to transmit the pilot signal within the special downlink subframe, in the case that no resource element has been searched, determine that the first configuration information is invalid or determine that the configuration of the pilot signal to be transmitted within the normal downlink subframe is valid while the configuration of the pilot signal to be transmitted within the special downlink subframe is invalid; and in the case that the configuration information is the second configuration information, search for the resource elements corresponding to the indices of the pilot signal carried in the second configuration information and configured to transmit the pilot signal within the special downlink subframe, and in the case that no resource element has been searched, determine that the second configuration information is invalid.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pilot signal configuration method, comprising steps of:
    determining configuration information about a pilot signal to be transmitted within a special downlink subframe for a User Equipment (UE); and
    transmitting a pilot signal configuration signaling to the UE,
    wherein the step of determining configuration information about the pilot signal to be transmitted within the special downlink subframe for the UE comprises: determining first configuration information about the pilot signal for the UE, the first configuration information indicating that the pilot signal is to be transmitted within both a normal downlink subframe and the special downlink subframe, or determining second configuration information about the pilot signal for the UE, the second configuration information indicating that the pilot signal is to be transmitted within the special downlink subframe rather than the normal downlink subframe; and
    wherein the step of transmitting the configuration information to the UE comprises: transmitting third pilot signal configuration signaling to the UE, the third pilot signal configuration signaling carries configuration information determined for the UE, and the configuration information determined for the UE includes the first configuration information or the second configuration information.

2. The pilot signal configuration method according to claim 1, wherein the configuration information about the pilot signal comprises one or more indices of the pilot signal, each of all or parts of the one or more indices of the pilot signal corresponds to a group of resource elements for transmitting the pilot signal within the special downlink subframe, and the one or more indices of the pilot signal correspond to different resource elements.

3. The pilot signal configuration method according to claim 1, wherein the step of transmitting the configuration information to the UE comprises transmitting second pilot signal configuration signaling different from first pilot signal configuration signaling to the UE, the first pilot signal configuration signaling carries configuration information about the pilot signal to be transmitted within a normal downlink subframe, and the second pilot signal configuration signaling carries the configuration information about the pilot signal to be transmitted within the special downlink subframe.

4. The pilot signal configuration method according to claim 3, wherein the second pilot signal configuration signaling further carries indication information for indicating the pilot signal corresponding to the configuration information about the pilot signal to be transmitted within the special downlink subframe to be transmitted within the special downlink subframe, and the first pilot signal configuration signaling further carries indication information for indicating the pilot signal corresponding to the configuration information about the pilot signal to be transmitted within the normal downlink subframe to be transmitted within the normal downlink subframe.

5. A pilot signal configuration method, comprising steps of:
    receiving a pilot signal configuration signaling about a pilot signal; and
    determining a configuration of the pilot signal to be transmitted within a special downlink subframe in accordance with the pilot signal configuration signaling,
    wherein the step of receiving the configuration information about the pilot signal comprises receiving third pilot signal configuration signaling; and
    the third pilot signal configuration signaling carries configuration information determined for a current UE, the configuration information determined for the current UE comprises first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe,
    wherein the configuration information about the pilot signal comprises one or more indices of the pilot signal, each of all or parts of the one or more indices of the pilot signal corresponds to a group of resource elements for transmitting the pilot signal within the special downlink subframe, and the one or more indices of the pilot signal correspond to different resource elements.

6. The pilot signal configuration method according to claim 5, wherein the step of receiving the configuration information about the pilot signal comprises receiving second pilot signal configuration signaling different from first pilot signal configuration signaling, the first pilot signal configuration signaling carries configuration information about the pilot signal to be transmitted within a normal downlink subframe, and the second pilot signal configuration signaling carries the configuration information about the pilot signal to be transmitted within the special downlink subframe.

7. The pilot signal configuration method according to claim 6, wherein the step of receiving the second pilot signal configuration signaling different from the first pilot signal configuration signaling comprises: receiving pilot signal configuration signaling; and determining the pilot signal configuration signaling as the second pilot signal configuration signaling different from the first pilot signal configuration signaling in accordance with indication information carried in the received pilot signal configuration signaling, the second pilot signal configuration signaling further carries indication information for indicating the pilot signal corresponding to the configuration information about the pilot signal to be transmitted within the special downlink subframe to be transmitted within the special downlink subframe, and the first pilot signal configuration signaling further carries indication information for indicating the pilot signal corresponding to the configuration information about the pilot signal to be transmitted within the normal downlink subframe to be transmitted within the normal downlink subframe.

8. The pilot signal configuration method according to claim 5, wherein the step of determining the configuration of the pilot signal to be transmitted within the special downlink subframe in accordance with the configuration information comprises:

in the case that the configuration information is the first configuration information, searching for the resource elements corresponding to indices of the pilot signal carried in the first configuration information and configured to transmit the pilot signal within the special downlink subframe, in the case that no resource element has been searched, determining that the first configuration information is invalid or determining that the configuration of the pilot signal to be transmitted within the normal downlink subframe is valid while the configuration of the pilot signal to be transmitted within the special downlink subframe is invalid; and in the case that the configuration information is the second configuration information, searching for the resource elements corresponding to the indices of the pilot signal carried in the second configuration information and configured to transmit the pilot signal within the special downlink subframe, and in the case that no resource element has been searched, determining that the second configuration information is invalid.

9. A base station, comprising a processor, a memory and a transceiver, wherein the processor is configured to read programs stored in the memory, so as to determine configuration information about a pilot signal to be transmitted within a special downlink subframe for a User Equipment (UE), and transmit through the transceiver a pilot signal configuration signaling to the UE, the transceiver is configured to receive and transmit data, and the processor takes charge of managing bus architecture as well as general processings, and the memory is configured to store therein data for the operation of the processor, wherein the processor is further configured to determine first configuration information about the pilot signal for the UE, the first configuration information indicating that the pilot signal is to be transmitted within both a normal downlink subframe and the special downlink subframe, or determine second configuration information about the pilot signal for the UE, the second configuration information indicating that the pilot signal is to be transmitted within the special downlink subframe rather than the normal downlink subframe; and wherein the processor is further configured to transmit third pilot signal configuration signaling to the UE, the third pilot signal configuration signaling carries configuration information determined for the UE, and the configuration information determined for the UE comprises the first configuration information or the second configuration information.

10. The base station according to claim 9, wherein the configuration information about the pilot signal comprises indices of the pilot signal, each of all or parts of the indices of the pilot signal corresponds to a group of resource elements for transmitting the pilot signal within the special downlink subframe, and the indices of the pilot signal correspond to different resource elements.

11. The base station according to claim 9, wherein the processor is further configured to transmit second pilot signal configuration signaling different from first pilot signal configuration signaling to the UE, the first pilot signal configuration signaling carries configuration information about the pilot signal to be transmitted within a normal downlink subframe, and the second pilot signal configuration signaling carries the configuration information about the pilot signal to be transmitted within the special downlink subframe, wherein the second pilot signal configuration signaling further carries indication information for indicating the pilot signal corresponding to the configuration information about the pilot signal to be transmitted within the special downlink subframe to be transmitted within the special downlink subframe, and the first pilot signal configuration signaling further carries indication information for indicating the pilot signal corresponding to the configuration information about the pilot signal to be transmitted within the normal downlink subframe to be transmitted within the normal downlink subframe.

12. A User Equipment (UE), comprising a processor, a memory and a transceiver, wherein the processor is configured to read programs stored in the memory, so as to receive through the transceiver a pilot signal configuration signaling about a pilot signal, and determine a configuration of the pilot signal to be transmitted within a special downlink subframe in accordance with the pilot signal configuration signaling, the transceiver is configured to receive and transmit data, and the processor takes charge of managing bus architecture as well as general processings, and the memory is configured to store therein data for the operation of the processor, wherein the processor is further configured to receive third pilot signal configuration signaling; and the third pilot signal configuration signaling carries configuration information determined for a current UE, the configuration information determined for the current UE comprises first configuration information or second configuration information, the first configuration information indicates that the pilot signal is to be transmitted within both a normal downlink subframe and the special downlink subframe, and the second configuration information indicates that the pilot signal is to be transmitted within the special downlink subframe rather than the normal downlink subframe, wherein the processor is further configured to:

in the case that the configuration information is the first configuration information search for the resource elements corresponding to one or more indices of the pilot signal carried in the first configuration information and configured to transmit the pilot signal within the special downlink subframe, in the case that no resource element has been searched, determine that the first configuration information is invalid or determine that the configuration of the pilot signal to be transmitted within the normal downlink subframe is valid while the configuration of the pilot signal to be transmitted within the special downlink subframe is invalid; and in the case that the configuration information is the second configuration information, search for the resource elements corresponding to the one or more indices of the pilot signal carried in the second configuration information and configured to transmit, the pilot signal within the special downlink subframe, and in the case that no resource element has been searched, determine that the second configuration information is invalid.

13. The UE according to claim 12, wherein the configuration information about the pilot signal comprises one or more indices of the pilot signal, each of all or parts of the one or more indices of the pilot signal corresponds to a group of resource elements for transmitting the pilot signal within the special downlink subframe, and the one or more indices of the pilot signal correspond to different resource elements.

14. The UE according to claim 12, wherein the processor is further configured to receive second pilot signal configuration signaling different from first pilot signal configuration signaling, the first pilot signal configuration signaling carries configuration information about the pilot signal to be transmitted within a normal downlink subframe, and the second pilot signal configuration signaling carries the configuration information about the pilot signal to be transmitted within the special downlink subframe; or wherein the processor is further configured to: receive pilot signal configuration signaling; and determine the pilot signal configuration signaling as the second pilot signal configuration signaling different from the first pilot signal configuration signaling in accordance with indication information carried in the received pilot signal configuration signaling, the second pilot signal configuration signaling further carries indication information for indicating the pilot signal corresponding to the configuration information about the pilot signal to be transmitted within the special downlink subframe to be transmitted within the special downlink subframe, and the first pilot signal configuration signaling further carries indication information for indicating the pilot signal corresponding to the configuration information about the pilot signal to be transmitted within the normal downlink subframe to be transmitted within the normal downlink subframe.

\* \* \* \* \*